US008856645B2

(12) United States Patent
Vandervort et al.

(10) Patent No.: US 8,856,645 B2
(45) Date of Patent: Oct. 7, 2014

(54) GENERATING FORMATTED DOCUMENTS BASED ON COLLECTED DATA CONTENT

(75) Inventors: David Russell Vandervort, Walworth, NY (US); Venkatesh Guru Rao, Arlington, VA (US); Jesse Silverstein, Rochester, NY (US); Michael Collins Allers, Ann Arbor, MI (US)

(73) Assignee: Xerox Corporation, Norwalk, CT (US)

( * ) Notice: Subject to any disclaimer, the term of this patent is extended or adjusted under 35 U.S.C. 154(b) by 753 days.

(21) Appl. No.: 12/408,431

(22) Filed: Mar. 20, 2009

(65) Prior Publication Data

US 2010/0241951 A1    Sep. 23, 2010

(51) Int. Cl.
*G06F 3/00*    (2006.01)
*G06F 17/30*    (2006.01)
*G06F 17/27*    (2006.01)
*G06Q 10/00*    (2012.01)

(52) U.S. Cl.
CPC ...... *G06F 17/30861* (2013.01); *G06F 17/2775* (2013.01); *G06Q 10/00* (2013.01); *G06F 17/30716* (2013.01)
USPC .......................................................... 715/251

(58) Field of Classification Search
USPC .................... 715/234, 243, 254, 255, 251
See application file for complete search history.

(56) References Cited

U.S. PATENT DOCUMENTS

| 6,049,812 | A | 4/2000 | Bertram et al. |
| 6,236,400 | B1 * | 5/2001 | Guerrero ....................... 715/841 |
| 6,356,898 | B2 | 3/2002 | Cohen et al. |
| 6,377,983 | B1 | 4/2002 | Cohen et al. |
| 6,691,163 | B1 | 2/2004 | Tufts |
| 6,877,137 | B1 | 4/2005 | Rivette et al. |
| 7,159,023 | B2 | 1/2007 | Tufts |
| 7,743,331 | B1 * | 6/2010 | Fleischer et al. ............... 715/731 |
| 2002/0138486 | A1 | 9/2002 | Rishel |
| 2004/0237037 | A1 | 11/2004 | Sweet et al. |
| 2005/0076000 | A1 | 4/2005 | Sweet et al. |
| 2005/0086606 | A1 * | 4/2005 | Blennerhassett et al. ...... 715/760 |
| 2005/0188300 | A1 | 8/2005 | Sweet et al. |

(Continued)

FOREIGN PATENT DOCUMENTS

EP    0957437 A2    11/1999
WO    99/12109    3/1999

OTHER PUBLICATIONS

"Help: Introduction to Semantic MediaWiki", http://semantic-mediawiki.org/wiki/Help: Introduction_to_Semantic_MediaWiki, 3 pages, Aug. 6, 2008.

(Continued)

*Primary Examiner* — Kyle Stork
(74) *Attorney, Agent, or Firm* — Hoffmann & Baron, LLP

(57) ABSTRACT

Embodiments described herein include a document generator, which is implemented using a computing system with one or more computing devices, to generate a formatted document associated with a collection of data page units. The document generator or can include a collector, an organization unit, and a formatting unit. The collector facilitates collecting data page units in response to a user selection. The data page units are collected intact and in their original format and are associated with a first ordered sequence. The organization unit facilitates re-sequencing the data page units to associate the data page units with a second ordered sequence. The formatting unit facilitates outputting a formatted document incorporating the collected data page units in the second ordered sequence.

17 Claims, 11 Drawing Sheets

(56) References Cited

U.S. PATENT DOCUMENTS

| | | | | |
|---|---|---|---|---|
| 2006/0085492 | A1* | 4/2006 | Singh et al. | 707/203 |
| 2006/0277460 | A1* | 12/2006 | Forstall et al. | 715/513 |
| 2006/0277481 | A1* | 12/2006 | Forstall et al. | 715/764 |
| 2007/0106952 | A1* | 5/2007 | Matas et al. | 715/764 |
| 2008/0219123 | A1* | 9/2008 | Basile et al. | 369/84 |
| 2008/0281867 | A1* | 11/2008 | Kendall et al. | 707/104.1 |
| 2009/0216749 | A1* | 8/2009 | Hardt | 707/5 |
| 2010/0205276 | A1* | 8/2010 | Quintarelli | 709/217 |
| 2011/0202483 | A1* | 8/2011 | Bergman et al. | 706/11 |

OTHER PUBLICATIONS

Jack H. et al., "Wikihow User's Manual: About Wikihow", http://www.wikihow.com/About-wikiHow, 4 pages.

Hewlett-Packard Development Company, L.P.,"Print Web Pages Efficiently", http://h71036.www7.hp.com/hho/cache/344494-0-0-225-121.html?jumpid=reg_R1002_U, 3 pages.

Pedia Press, "PadiaPress-Home", http://pediapress.com/, 3 pages.

Radar Networks, "Twine Tour", http://www.twine.com/tour, 7 pages.

Digg, Inc., "Digg Tour", http://digg.com/tour/1, 5 pages.

StumbleUpon, "About StumbleUpon", http://www.stumbleupon.com/aboutus, 2 pages.

WordPress, "WordPress", http://wordpress.org/about/features, 2 pages.

Blurb, Inc, "Blurb Book Smart", http://www.blurb.com/learn_more/booksmart, 4 pages.

Bush, Vannevar, "As We May Think," The Atlantic Online, www.theatlantic.com;doc/print/194507/bush, 12 pages, Jul. 1945.

OCLC News Releases, "OCLC's New Web Harvester Captures Web Content to Add to Digital Collections," http://www.oclc.org/news/releases/200829.htm, 2 pages, Jul. 29, 2008.

M. Dontcheva, S.M. Drucker, G. Wade, D. Salesin and M.F. Cohen, "Collecting and Organizing Web Content," Personal Information Managment—A SIGIR 2006 Workshop, pp. 44-47.

European Search Report and Written Opinion, Jul. 6, 2010.

\* cited by examiner

```
<traildoc application="XXXXX" version="X.X">
  <node type="trail" hash="35a9d239-32dc-102c-8e8b-d85627bf4b38">
    . . .
    <name>New Trail</name>
    <desc> Description </desc>
    . . .
    <source_url>http://XXXXXXX/XXXXXX/trails/?t=6</source_url>
    <source_site>http://XXXXXXX/XXXXXX</source_site>
    <tags/>
    <children>
      <node type="node" hash="522ef09f-32dc-102c-8e8b-d85627bf4b38" comment="">
        <id>7</id>
        <reference_id>256</reference_id>
        <name>Three Leaps of Faith Rule</name>
        . . .
        <source_url>http://XXXXXXXX/XXXX/the-three-leaps-of-faith-rule/?t=6</source_url>
        <source_site>http://XXXXXXXX/XXXX</source_site>
        <tags/>
        <wp_tags/> <wp_categories><category>General</category>
        <category>Thinking</category></wp_categories>
        <children>
          <node type="reference" hash="58855dc3-32dc-102c-8e8b-d85627bf4b38" default="1"/>
        </children>
      </node>
      <node type="node" hash="58855dc3-32dc-102c-8e8b-d85627bf4b38" comment="">
        <id>8</id>
        <reference_id>289</reference_id>
        <name> Happy First Birthday, Ribbonfarm </name>
        . . .
        <source_url>http:// XXXXXXXX/XXXX/happy-first-birthday-ribbonfarm/?t=6</source_url>
        <source_site>http://XXXXXXXX/XXXX</source_site>
        <tags/>
        . . .
        <children>
          <node type="reference" hash="5885a470-32dc-102c-8e8b-d85627bf4b38" default="1"/>
          <node type="reference" hash="5885e3e2-32dc-102c-8e8b-d85627bf4b38"/>
        </children>
      </node>
      . . .
      </node>
    </children>
  </node>
</traildoc>
```

FIG. 9

GENERATING FORMATTED DOCUMENTS BASED ON COLLECTED DATA CONTENT

BACKGROUND

1. Technical Field

The presently disclosed embodiments are directed to organizing collected data page units and generating a formatted document incorporating the collected data page units.

2. Brief Discussion of Related Art

The Internet offers a vast amount of web content, which is typically accessible using a web browser. Users can use a search engine to search for web sites by entering search terms, which typically returns a list of web sites having a correlation with the provided search terms. Alternatively, users can enter a uniform resource locator (URL) address to navigate directly to a web site and/or can select a link on a web page to navigate to another web page associated with the link. Conventionally, people who wish to keep information they find on the Internet typically have few options for organizing the information in ways meaningful to themselves. As such, people are generally at the mercy of the stateless nature of the web browser and the design choices of information producers.

SUMMARY

According to aspects illustrated herein, there is provided a method for generating a formatted document associated with a collection of data page units using a document generator implemented by a computing system with one or more computing devices. The method includes collecting data page units using a collector of the document generator in response to a user selection. The data page units are collected intact and in their original format and are associated with a first ordered sequence. The method also includes re-sequencing the data page units using an organization unit of the document generator to associate the data page units with a second ordered sequence and outputting a formatted document incorporating the data page units in the second ordered sequence using a formatting unit of the document generator.

According to other aspects illustrated herein, there is provided a computer readable medium storing instructions executable by a computing system including at least one computing device, wherein execution of the instructions implements a method for generating a formatted document associated with a collection of data pages. The method implemented when the instructions are executed includes collecting data page units using a collector of the document generator in response to a user selection. The data page units are collected intact and in their original format and are associated with a first ordered sequence. The method implemented when the instructions are executed also includes re-sequencing the data page units using an organization unit of the document generator to associate the data page units with a second ordered sequence and outputting a formatted document incorporating the data page units in the second ordered sequence using a formatting unit of the document generator.

According to further aspects illustrated herein, there is provided a system for generating a formatted document associated with a collection of data page units. The system includes a computing system including at least one computing device. The computing system is configured to implement a collector, a organization unit, and a formatting unit. The collector collects data page units in response to a user selection. The data page units are collected intact and in their original format and are associated with a first ordered sequence. The organization unit re-sequences the data page units to associate the data page units with a second ordered sequence using the document generator. The formatting unit outputs a formatted document incorporating the data page units in the second ordered sequence.

BRIEF DESCRIPTION OF THE DRAWINGS

FIG. 9 illustrates an exemplary underlying data structure implemented to maintain an ordered sequence of collected data page units for incorporation into a formatted document.

DETAILED DESCRIPTION

Figure 1:
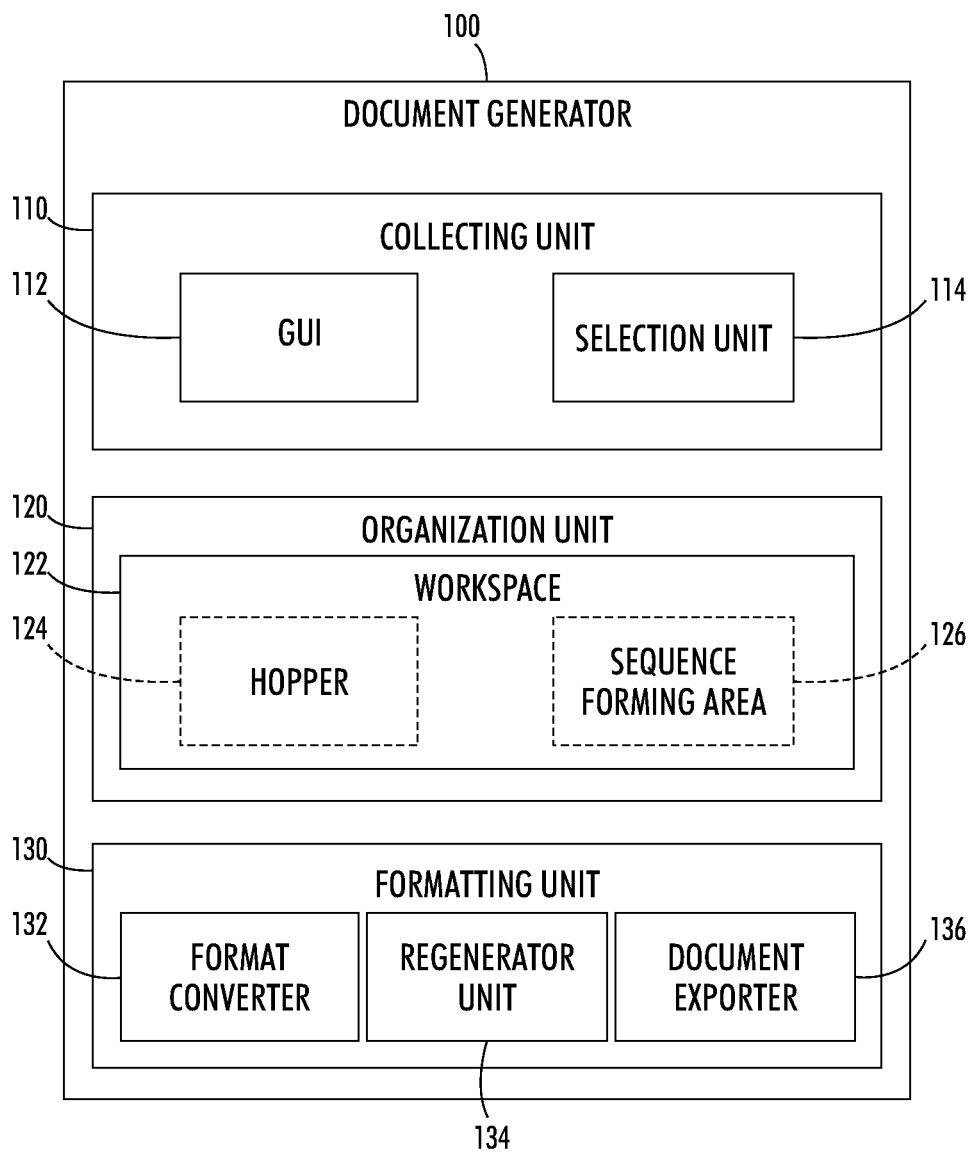
FIG. 1 is a block diagram of an exemplary embodiment of a document generator.

Exemplary embodiments include a document generator that allows users to collect data page units, or portions of data page units, intact and in their original format, arrange the collected data page units into a desired ordered sequence, and output a formatted document incorporating the data page units arranged in the ordered sequence. As such, a user can repackage information from multiple sources, to pick and choose not only the content they want, but to actually design whole new documents with the information. Embodiments of the data generator allow users to add semantic structure or other features to documents and enable an on-the-fly architecture of document creation to enhance content discovery, organization, and presentation experiences possible on the web.

As used herein, a "document generator" refers to a tool implemented using one or more computing devices for collecting and organizing data page units, and outputting formatted documents incorporating the collected and organized data page units. The document generator can include components, such as a collector to collect data page units, an organization unit to manipulate the data page units, and a formatting unit to output a formatted document that incorporates the collected data page units in an ordered sequence defined using the organization unit.

As used herein, an "ordered sequence" refers to a defined arrangement of the data page units as a partially ordered set, a totally-ordered set, a strict sequence, and the like. An ordered sequence of data page units can include one or more paths and the ordered sequence can be defined by user-assigned relationships between the data page units.

As used herein, a "data page" refers to a page from a document, such as a web page, a page from a word processing document, a page from a portable document file (PDF), and the like.

As used herein, a "chunk" refers to a contiguous segment or section of content in a collected data page or a collected portion of a data page, where a "contiguous segment" or "contiguous section" refers to adjacently located elements or content in a collected data page or a collected portion of a data page. Some examples of a contiguous segment or section include a paragraph, consecutive paragraphs, a sentence, consecutive sentences, a word, consecutive words, and the like. Chunks can be defined by encapsulating contiguous segment or section, where "encapsulating" refers to defining the boundaries of a contiguous segment using markers, such as tags in a mark-up language. Collected data pages, collected portions of data pages, and chunks are collectively referred to herein as "data page units".

As used herein, a "formatted document" refers to a multi-page document having a specified layout, font type, file type, and the like.

As used herein, a "format" refers to a specified configuration of a file and/or content within the file and an "original format" refers to a format in which a data page is presented prior to being collected.

As used herein, "intact" refers to collecting a data page or a portion of the data page as a unit to preserve the original format and presentation of the data page or portion of the data page.

As used herein, a "website" refers to a set of web pages generally, but not necessarily located on the same server with the same domain name and a "web page" is a single page generally associate with a Uniform Resource Identifiers (URIs) address, such as a Uniform Resource Locator (URL) address. To move from first web page to second web page, the first web page generally includes a hyperlink to the second web page embedded therein that must be selected by a user.

As used herein, a "reference" refers to an identifier associated with a data page. References can be user-defined, predefined, or otherwise specified, and can include, for example, addressing schemes including Uniform Resource Locators (URLs), Uniform Resource Identifiers (URIs), extensible mark-up language (XML) path (XPath) addresses, sequential numbering and/or alphabetizing schemes, descriptive text identifiers, such as titles of the data pages, and the like.

As used herein, the terms "organizing", "arranging", and "sequencing" refer to specifying, or otherwise forming one or more ordered sequences and "reorganizing", "rearranging", and "re-sequencing" refers to changing or otherwise modifying previously formed ordered sequences.

As used herein, "retrieving" refers to locating and reading data from a storage location, "converting" refers to changing or transforming the format of data page unit to another format, and "collecting" refers to accumulating intact data pages, or portions thereof, or references to intact data pages, or portions thereof, for use in the generation of a formatted document, and "outputting" refers to generating and exporting a formatted document in a viewable format. Data pages can be collected without regard to whether an existing linking structure exists between the data pages.

As used herein, "distributing" refers to making generated formatted documents available for viewing, downloading, or otherwise transferring the formatted documents to one or more users.

As used herein, "modifying" refers to changing, altering, or revising information, such as a data page unit or an ordered sequence of data page units.

As used herein, a "relationship" refers to an association between two or more data page units generally defined by a user. The relationship between two or more data page units occurs external to the data page units such that relationships are not inserted into, or defined within, the data page units. As such, the relationships can define external connections between independent discrete data page units so that a connection between the data page units is not defined by hyperlinks within the data page units. A relationship may be arbitrarily or otherwise defined and may be explicit or implicit in nature. Data page units that have a relationship are referred to herein as being "interconnected." Data page units can be disconnected to remove a relationship and can be reconnected to redefined relationships between the data page units.

As used herein, "user-defined" and "user-assigned" refer to specifications received from a user, such as, for example, a specification of a relationship between two data page units.

As used herein, a "computing device" can be a mainframe, personal computer (PC), laptop computer, workstation, handheld device, such as a PDA, or the like, that includes a processing unit and is configured to implement the document generator or at least a portion of the document generator.

As used herein, "explicit selection" refers to an interaction between a user and the document generator to collect a particular data page desired by the user, where the data page is not collected unless the user selects it.

As used herein, the terms "activate" and "select" refer to initiating or triggering an action. Activation can result from, for example, the selection of a button, or other object, in a graphical user interface by clicking on a button of a mouse to initiate an operation performed by the document generator.

As used herein, the terms "depicting" and "displaying" refer to rendering information on a display in a viewable form.

As used herein, a "graphical reference object" refers to a visual representation of a reference and can include, for example, various shapes, with or without textual components, thumbnail images, or other indicia used to portray a reference to a data page unit.

As used herein, "graphical user interface" refers to an area or region being displayed to a user to allow the user to interact with the document generator.

As used herein, "shared data page unit" refers to a data page unit joining at least two paths of ordered sequences such that the shared data page unit represents a convergence of the at least two paths.

A "repository" or "database" refers to a storage system in which information, such as collected data page units and/or formatted documents are stored. The information stored in the repository or database is accessible to one or more users, where "accessible" refers to the ability to retrieve information from the repository or database.

As generally understood by those skilled in the art, "metadata" refers to information about information. Some examples of metadata that can be associated with data page units include a label, description, a version number, a date on which the data pages was collected, and the like.

As used herein, a "path" refers to a contiguous ordered sequence of data page units from a first data page unit to a last data page unit. A path can diverge into two or more separate paths of ordered sequences of data page units, where each path includes an ordered sequence of data pages units, and can converge into a single path, where two or more ordered sequences of data page units join at a shared data page unit.

As used herein, a "visual diagram" refers to a chart or graph that displays information based on a position, color, shape, and the like, of objects and/or connections defined between the objects. An example of a visual diagram is a directed graph is that includes nodes and edges to define a hierarchical structure of the nodes.

As used herein, a "web browser" or "browser" refers to a software application implemented using a computing device to access and navigate the Internet, Intranet, or other compilation of files generated in suitable mark-up languages.

A "plug-in" or "add-on" refers to an application that interacts with a host application, such as a web browser, to provide extend the operation of the host application to include operation supported by the plug-in.

As used herein, a "workspace" refers to a graphical user interface (GUI) defining a container in which a user can arrange graphical reference objects referencing collected data page units and define relationships between the graphical reference objects to generate ordered sequences of data page units.

As used herein, a "hopper" refers to a GUI in which graphical reference objects are displayed prior to be being inserted into the workspace.

An "underlying data structure" refers to a data file that maintains information concerning the references to the data pages collected and the user-assigned relationships between the data pages to facilitate depicting an ordered sequence of data page units using a visual diagram.

FIG. 1 depicts a block diagram of a document generator 100 that includes a content collecting unit 110 (hereinafter "collector 110"), an organization unit 120, and a document formatting unit 130 (hereinafter "formatting unit 130"). The document generator 100 can be used to generate a formatted document of data page units, such as web pages, collected by a user. The document generator 100 allows a user to collect data page units in a first ordered sequence, edit and/or sectionalize the collected data page units, arrange the collected data page units into a second ordered sequence, and generate a formatted document incorporating the collected data page units in the second ordered sequence. In some embodiments, the formatted document can be generated in a word processing document format (e.g., Microsoft® Word®) portable document format (PDF), slide presentation format (e.g., Microsoft® PowerPoint®), LaTex-based format, mark-up language format, such as hypertext mark-up language (HTML), extensible mark-up language (XML), and the like, and/or other suitable format.

The collector 110 can include a graphical user interface (GUI) 112 and a selection unit 114. The collector 110 enables a user to selectively and/or arbitrarily collect data pages, or portions data pages, intact and in their original format, to be included in a ordered sequence of data page units in response to an explicit and/or implicit activation of the selection unit 114. The GUI 112 can be a stand alone user interface or can be embedded in an application, such as a web browser, web application, software plug-in, and/or the like. In some embodiments, the selection unit 114 can include one or more graphical objects or widgets, such as a button, check box, toggle switch, other selection mechanisms implemented as an instance of an object or widget in the GUI 112.

The GUI 112 allows users to explicitly select data pages to be included in the ordered sequence by interacting with the selection unit 114 using a data entry device, such as a mouse, keyboard, touch screen, microphone, and the like. Once a user has selected the data pages, the selection unit 114 stores the selected data pages or a reference to the selected data pages in a storage medium for further processing by the document generator 100. For example, when the selection unit 114 is activated, either the data page, such as web page, or a reference to the data page, such as a Uniform Resource Locator (URL) of the webpage, is stored in storage for further processing by the document generator 100. Users can collect a sequential list of data pages using the collector 110.

In some embodiments, the collector 110 can include an area selector 116 to allow the user to specify and collect a contiguous region, such as a paragraph or consecutive paragraphs, in a data page without collecting the entire data page. The area selector 116 can be configured to define a window around the contiguous content in the data page in response to an input received from the user. Once the window has been defined around the desired content, the user can activate the selection unit 114, which collects the contiguous region of content in the data page or collects a reference to the contiguous region of the content in the data page. The selected content from the region remains intact and in its original format when it is collected. Once a contiguous region in a data page has been collected, the contiguous region itself is referred to herein as a data page. The processing performed to generate a document is independent of whether an entire data page, such as a web page, or a contiguous region, such as a consecutive paragraphs, in a data page have been collected.

In some embodiments, the collection of data pages can be performed automatically in the background. For example, the collection unit 110 can be configured such that whenever a user visits a new web page, the web page can be collected. In such embodiments, the selection unit 114 is activated when the user visits a new web page without an explicit selection being made for by the user each new page.

The collector 110 is inherently stronger than cutting-and-pasting content of a data page into a document file or some other repository. As one example, the collector 110 removes the possibility of human error. As another example, the collector 110 maintains and allocates storage space, relieving the user of the need to decide whether to paste into one format or another format, where to store the file, and the like. Inherent in having the document generator manage storage is that users can be enabled to have several storage spaces, switching between them as needed.

The organization unit 120 can include a workspace 122, in which references, such as graphical reference objects, of the selected data pages, or the data pages themselves can be arranged in a user-defined, ordered sequence. Initially, the data pages can be organized in a sequence corresponding to the sequence in which the user collected the data pages. Using the organization unit 120, a user can organize the selected data pages into a different ordered sequence by moving the graphical reference objects within the workspace 122. In some embodiments, the workspace 122 of the organization unit 120 can be implemented as a plug-in for a website.

In some embodiments, a user can organize the selected data pages into a desired, ordered sequence by defining relationships between the data pages to define a sequenced structure for document generation. Relationships between the selected data content can be defined by the user to interconnect the data pages without inserting or defining links within the data pages. The workspace 122 can include a hopper 124, in which the graphical reference objects first appear after the user has collected the data content, and can include an ordered sequence forming area 126, in which the user can arrange the graphical reference objects and connect the graphical reference objects to define relationships and an ordered sequence between the data content.

In some embodiments, the ordered sequence can be illustrated as a visual diagram in the form of, for example, a directed graph, where the nodes, represented as circles or other shapes, reference the selected data pages and the edges, represented as lines with directional arrows extending between nodes, illustrate the relationships between the references. Nodes of a directed graph can reference the collected data pages by associating a unique identifier with the data pages. For example, the nodes can represent addressing schemes including Uniform Resource Locators (URLs), Uniform Resource Identifiers (URIs), extensible mark-up language (XML) path (XPath) addresses, or other unique identifiers. Another scheme can include referencing the data pages using a sequential numbering and/or alphabetical system, where the numbers and/or letters are associated with the data pages based on the order specified by the user. Other schemes can allow a user to enter a descriptive identifier of the data pages, such as a title or summary of the data content.

The edges in the directed graph can represent a relationship between the nodes to impose a partial ordering, total ordering, strict ordering, and the like, on the collected data pages. The edges can be created explicitly, or can be created to mirror naturally-occurring relationships of the data content. For embodiments implementing a sequential numbering scheme to reference the data pages, the relationships can be defined based on the numbers assigned to the data pages such that consecutive numbers are defined as being related.

Using the relationships, the data pages can be placed in ordered sequences sharing some data pages and diverging along different paths that include different data pages. The user can define as many paths as desired. When document generation is performed for a multi-path arrangement of data pages, a formatted document can be generated for each path incorporating the data pages of the defined by the path so that the number of documents generated is equal to the number of paths that exist. For example, formatted documents can be generated where the first few pages of each document include an identical sequence of data pages shared by each path, but where subsequent pages diverge into different paths with different data pages or a different sequence of the same data pages.

In some embodiments, the organization unit 120 can allow the user to parse the collected data pages into contiguous segments of content, referred to herein as "chunks". The chunks can include contiguous data page elements or content including text, hyperlinks, graphics, and other media, which can be considered as a single logical unit. For example, the content of a collected data page can be parsed into multiple segments, where each segment contains contiguous content, such as a paragraph, consecutive paragraphs, a sentence, consecutive sentences, a word, consecutive words, and the like. In some embodiments, each data page is defined by default using chunks such that the entire collected data page is encapsulated as a chunk.

To define the chunks, the organization unit 120 can allow the user to apply mark-ups to the segments with tags that designate chunks. Chunks can be nested inside other chunks to any depth. The mark-up used to designate a chunk can be client specific and can assume any practical form. One example of a mark-up form that can be implemented is an XML-like mark-up tag defined as, for example, "<chunk>". To define a chunk using this example, the user can encapsulate the contiguous segment of content within the data page with chunk tags. Chunk mark-up tags can be overloaded to allow semantics-based searching, sorting and manipulation. The form of mark-up used herein is illustrative, those skilled in the art will recognize that the mark-up can be extended to create new structures within collected data pages and extracted from them. Some examples of structures can be three-dimensional representations of text or elements that change their form or even disappear completely if a given period of time has elapsed since their collection. By supporting mark-up of collected data pages, the collected data pages can be manipulated beyond changing the sequence in which the data pages are arranged. For example, users can define sub-chunks, add semantic content, or change the limits of a chunk.

The chunks of content can be moved up or down in their position relative to other chunks and data pages, can be removed completely from the collected data pages, and/or can be shifted to entirely different documents, without regard to their original ordering. For example, web pages in a sequence of collected data pages can be moved to different locations in the sequence, or deleted entirely. Chunks can also allow a user to change the order of sub-data page elements or content, such as the order of paragraphs, pictures, or links in the data page that have been defined using chunks. Chunks can also be combined from multiple data pages to form a conglomerate chunk defining a single unit composed of different chunks, which can be positioned in any arbitrary ordered sequence that can be changed. As a result, users can create unique documents based on the collected data pages and defined chunks. Collected data pages, portions of collected data pages, and chunks are collectively referred to herein as "data page units".

In some embodiments of the organization unit 120, users can facilitate editing the collected data content. For example, the organization unit 120 can allow the user to add notations that may be meaningful to the user, and/or can allow content, such as words or pictures to be edited directly. The organization unit 120 can restrict the editing capabilities to only users with authoring permissions. Each data page and/or defined chunk can be edited independently of one another.

The collected data page units can be associated with metadata, and the order sequence can be expressed using an XML document, database schema, or other suitable data format. Metadata defining additional information can be added to the collected data page units including, but not limited to the referenced web content itself, permission levels associated with nodes for various sorts of editing and sharing, copyright information for individual referenced pages, version information for dynamic pages, such as from wikis, and the like.

For example, a user can associate a label with a collected data page unit to associate additional information with the data page unit. The information can include a description of the data page units, a version of the data page units, a date on which the data page unit was collected, and the like. The metadata can also be implemented to restrict access to collected data page units or prevent modification of collected data page units. The metadata can be incorporated into a formatted document that is generated. For example, a description of a data page unit can be incorporated into the formatted document as an introduction to the data page unit.

The formatting unit 130 can generate document incorporating at least a portion of the data page units in the sequence defined by the user. The formatting unit 130 can include a format converter 134, a data page regenerator unit 134 (hereinafter "regenerator unit 134"), and a document exporter 136. The format converter 132 can receive the defined ordered sequence from the organization unit 110 and can reformat the data page units into a single format using the format converter. The data page units in the defined ordered sequence can have disparate formats and include mark-ups generated using the organization unit 120.

In some embodiments, prior to reformatting the data page units, the regenerator unit 134 can regenerate some, all, or none of the data page units to ensure that the data page units to be included in the formatted document include the most up-to-date content. For example, when the user decide to generate a formatted document, the regenerator unit 134 can retrieve the data page units from the original source of the data page units rather than relying on data page units, if any, stored by the user during the collection process. In some embodiments, when the data page unit is a web page, the regenerator unit 134 can navigate to the web page and recollect the web page for inclusion in the formatted document.

The reformatted data page units are used to generate formatted document that can be output by the document exporter 132 to facilitate distribution of the formatted document, displaying of the formatted document, printing of the of formatted document, and the like. Some examples of a formatted document can include a series of interlinked HTML pages, a LaTex document, a PDF document, an XML document, and the like. The document can be formatted to include multiple page sizes and layouts, such as, for example, saddlestich, trifold (e.g., brochure style), A4 paper size, and the like.

Figure 2:
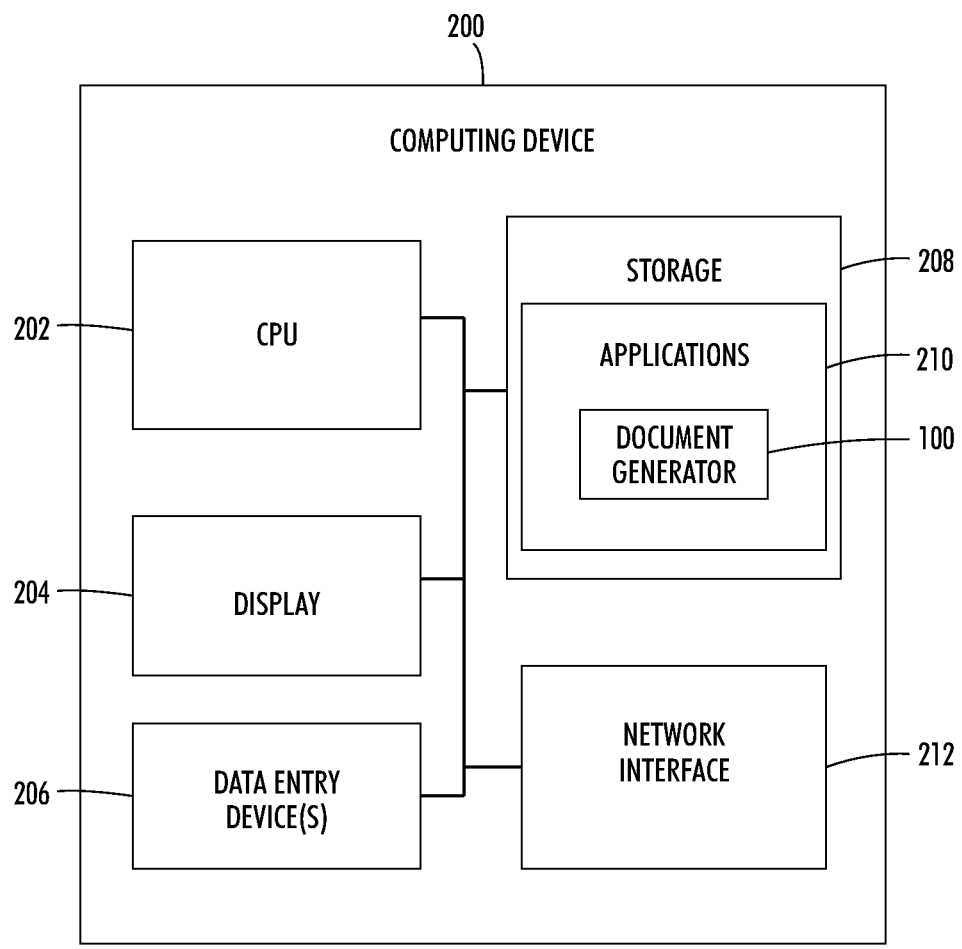
FIG. 2 illustrates an exemplary computing device configured to implement embodiments of the document generator.

FIG. 2 depicts an exemplary computing device 200 for generating a formatted document based on the discovery, organization, and processing of data page units using the document generator 100. The computing device 200 can be a mainframe, personal computer (PC), laptop computer, workstation, handheld device, such as a PDA, or the like. In the illustrated embodiment, the computing device 200 includes a central processing unit (CPU) 202 and can include a display device 204. The display device 204 enables the computing device 200 to communicate with an operator through a visual display. The computing device 200 can further include data entry device(s) 206, such as a keyboard, touch screen, and/or mouse. The computing device 200 can include storage 208 for storing data and instructions, such as collected data page units, generated formatted document, defined sequences between the data page units, applications, and the like. The storage 208 can include such technologies as a floppy drive, hard drive, tape drive, Flash drive, optical drive, read only memory (ROM), random access memory (RAM), and the like.

Applications 210, such as the document generator 100, or portions thereof, can be resident in the storage 208. The applications 210 can include instructions for implementing the document generator 100. The storage 208 can be local or remote to the computing device 200. The computing device 200 includes a network interface 212 for communicating with a network. The CPU 202 operates to run the applications 210 in storage 208 by performing instructions therein and storing data resulting from the performed instructions, which may be presented to a user via the display 204 or by other mechanisms known to those skilled in the art, such a print out from a printer. The data can include the collected data page units, defined sequences of collected data page units, formatted documents, information associated with the data page units and/or formatted document, and the like.

Figure 3:
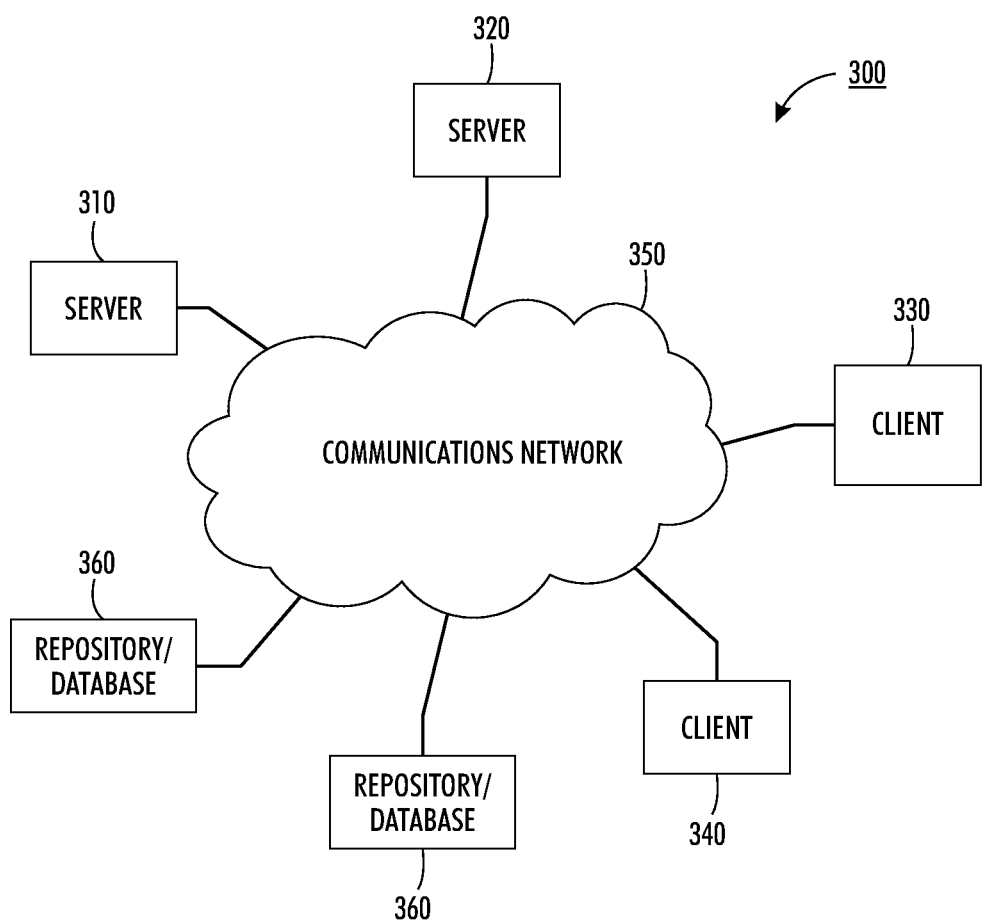
FIG. 3 illustrates an exemplary distributed system for implementing embodiments of the document generator.

FIG. 3 depicts an exemplary distributed system 300 for implementing embodiments of the document generator 100. The distributed system 300 includes one or more servers 310 and 320 coupled to clients 330 and 340, via a communication network 350, which can be any network over which information can be transmitted between devices communicatively coupled to the network. The system 300 can also include repositories or database devices 360, which can be coupled to the servers 310/320 and clients 330/340 via the communications network 350. The servers 310/320, clients 330/340, and database devices 360 can be implemented using a computing device, such as a computing device implemented in a similar manner as the computing device 200 of FIG. 2. In some embodiments, the document generator 100 can be implemented using a single computing device or can be implemented using multiple computing devices in a distributed manner.

The servers 310/320, clients 330/340, and/or databases 360 can store information, such as collected data page units, references to the collected data page units, user-defined sequences of the data page units, information associated with the data page units, mark-ups of the data page units, metadata, formatted documents, and the like. In some embodiments, the document generator 100 can be distributed among the servers 310/320, clients 330/340, and database devices 360 such that one or more components of the document generator 100 and/or portion of one or more components of the document generator 100 can be implemented by a different device (e.g. clients, servers, databases) in the communication network 350. For example, the collector 110 can be resident on the server 310 and/or the client 330, the organization unit 120 can be resident on the server 320, the formatting unit 130 can be resident on the client 330, and the collected data page units, generated formatted documents, and information associated with the generated documents can be stored in one or more of the database devices 360. For embodiments where at least a portion of the collector 110 is resident on the client 330, the portion of the collector 110 can be implemented as part of a web browser, mobile phone widget, and the like.

Figure 4:
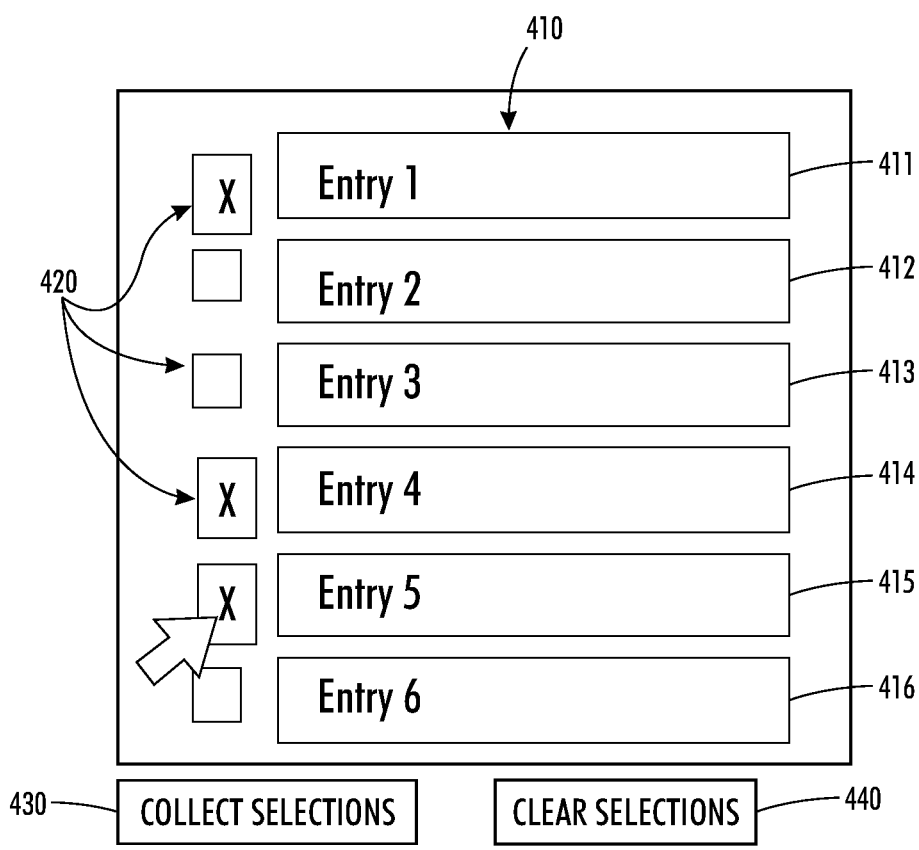
FIG. 4 illustrates an exemplary implementation of a collector for some embodiments of the document generator.

FIG. 4 depicts an exemplary implementation of the collector 110 of the document generator 100 implemented as a plug-in in a content management website configured, for example, to allow a user to develop and publish a blog. The user of the web site can have an account with the content management website. Upon logging into the account, the user can choose to install the document generator, or portions thereof, as a plug-in so that the function of the web site is extended to implement document generation. In some embodiments, the document generator can already be integrated with the website that no action is required by the user to make the document generator available for use.

The user can submit entries to the blog developed using the website and the website can publish the entries so that visitors of the blog can view the entries. The user can explicitly or otherwise collect a selection of entries to be included in the ordered sequence of data page units. In the present embodiment, the user can be presented with a list 410 of blog entries 411-416, which can represent some or all of the entries submitted by the user. The user can select one or more of the entries 411-416 to include in the ordered sequence of data page units by activating check boxes 420 associated with the entries 411-416. For example, the user can select check boxes corresponding to entries 411, 414, and 415.

When the user has selected the entries to include in an ordered sequence for document generation, the user can select a "Collect Selections" button 430. Upon activation of the button 430, references to the entries can be stored for subsequent use in the document generation. If the user wishes, to clear selected entries to restart to selection process, the user can activate a "Clear Selections" button 440. Although, the present example illustrates a content management web site implementing a blog, those skilled in the art will recognize that the present embodiment of the collector 110 can be implemented in other environments, such as for example, a web-based e-mail provider, a social networking web site, and the like.

Figure 5:
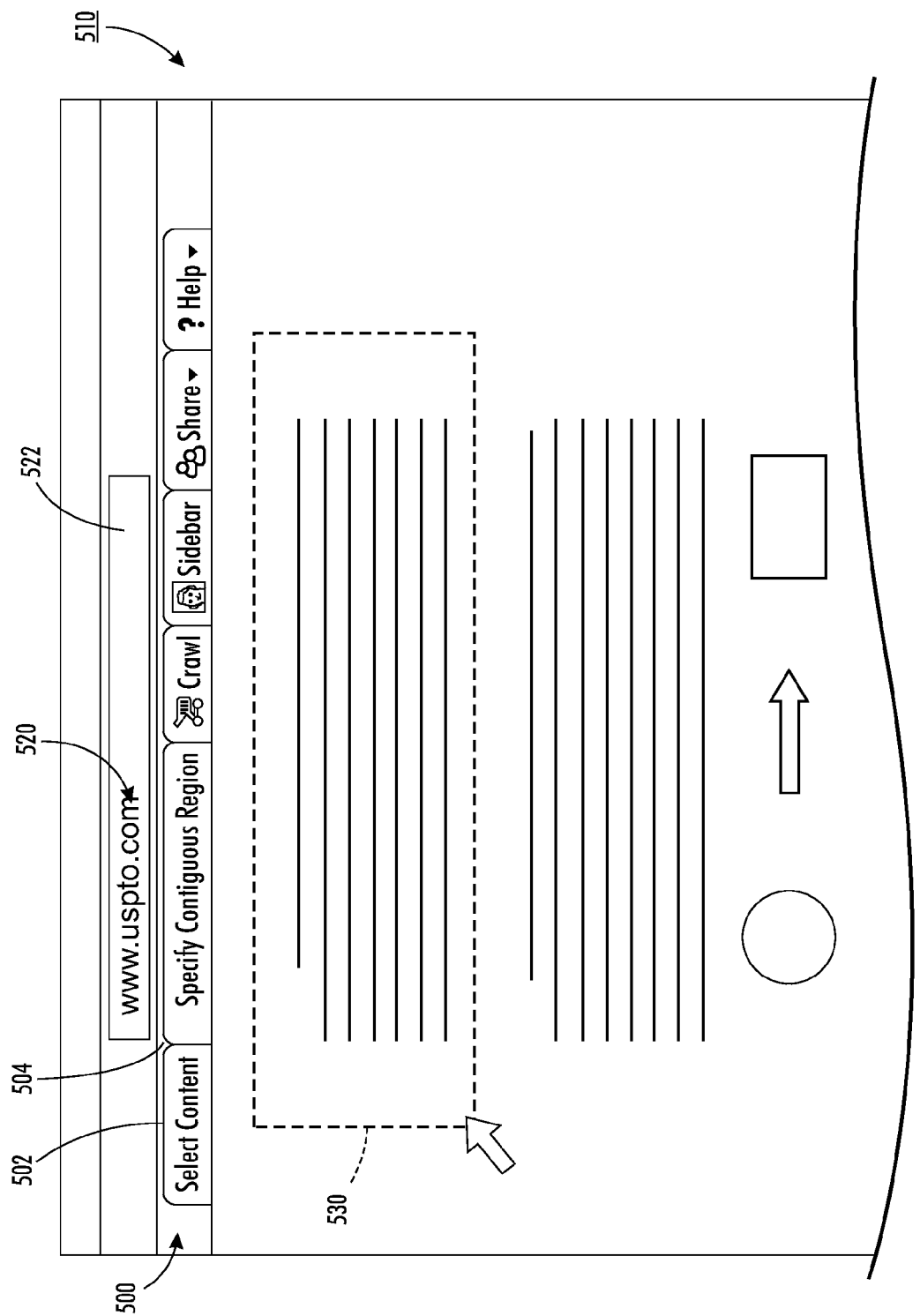
FIG. 5 illustrates another exemplary implementation of a collector for some embodiments of the document generator.

FIG. 5 illustrates another exemplary implementation of the collector 110 of the document generator 100. In the present embodiment, the collector 110 can be implemented as a toolbar 500 of a web browser 510. The toolbar 500 can include a "Select Content" button 502 and a "Specify Contiguous Region" button 504. Using the web browser 510, the user can navigate to a website by entering a uniform resource locator (URL) address 520 in a data entry field 522 or can navigate to a website via a search result obtained through a search engine. When the user reaches a web page that the user wishes to collect, the user can activate the button 502, which results in a reference to the web page, or the web page, being stored for use in document generation. In some embodiments, the references can be the URL address or any other unique identifier that is a predefined identifier or an identifier assigned by the user.

If the user wishes to collect a contiguous region of content on the web page, the user can activate the button 504, which allows the user to define a window region 530 around the contiguous content to be collect. Once the user has defined the window region, the user can activate the button 502 and the contiguous content within the window region is collected for subsequent use in document generation.

Figure 6:
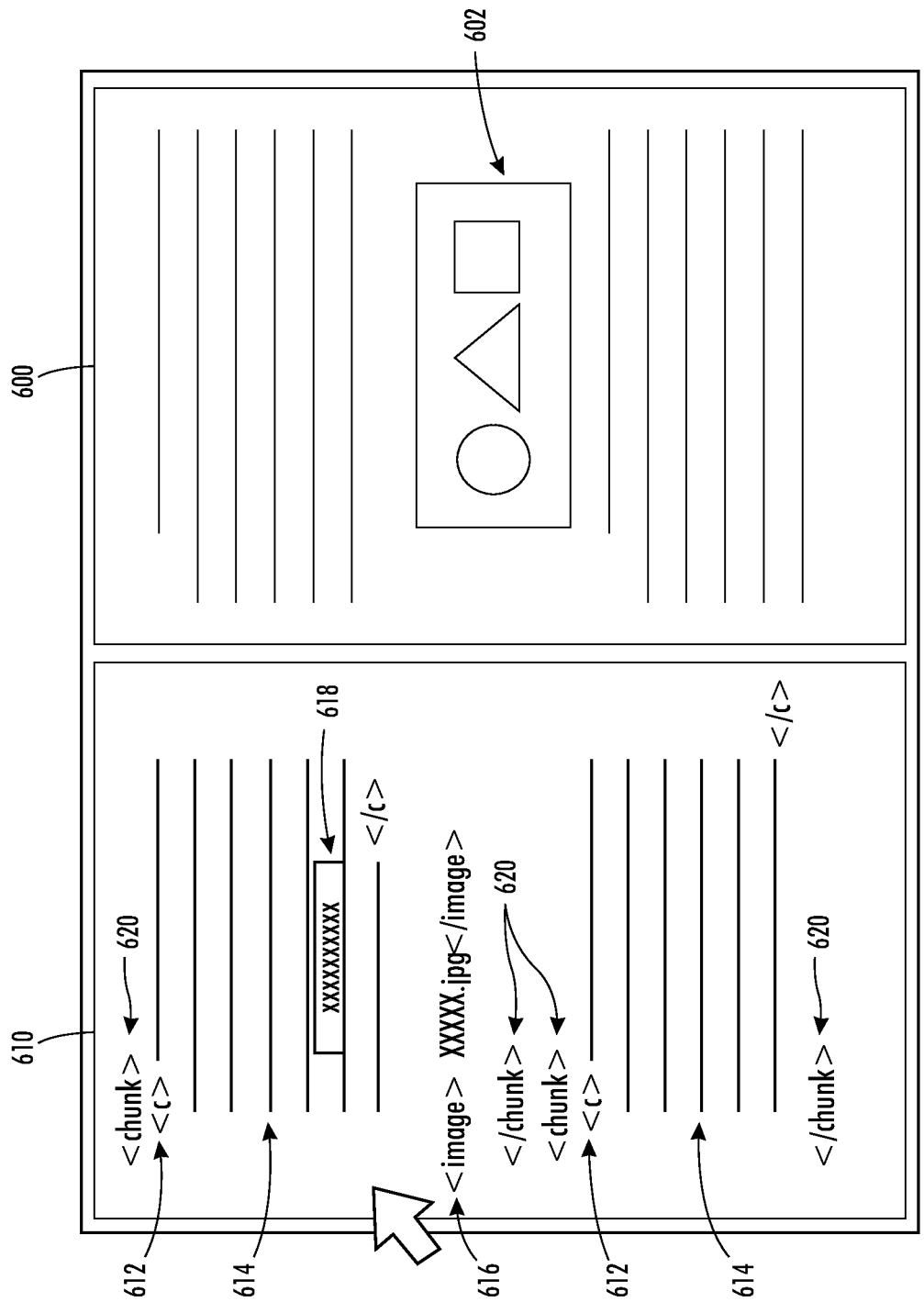
FIG. 6 illustrates an exemplary implementation of editing a collected data page.

FIG. 6 illustrates an exemplary implementation of editing a collected data page unit using the organization unit 120 of the document generator 100. In the present example, the data page unit is a web page 600, which is displayed side-by-side with the underlying hypertext mark-up language (HTML) file 610. The HTML file includes body text tags 612, text 614, and an image tag 616, which references the image 602 displayed in the web page 600.

The HTML file is opened as a document that is editable by the user so that the user can add, delete, or change the content of the web page. For example, the user can add text 618 to the HTML file 610, which can subsequently be reflected in the web page 600. The user can also insert chunk tags 620 into the HTML file to define contiguous chunks of data, which can be rearranged in the ordered sequence independent of the data page unit in which it original appeared.

Figure 7:
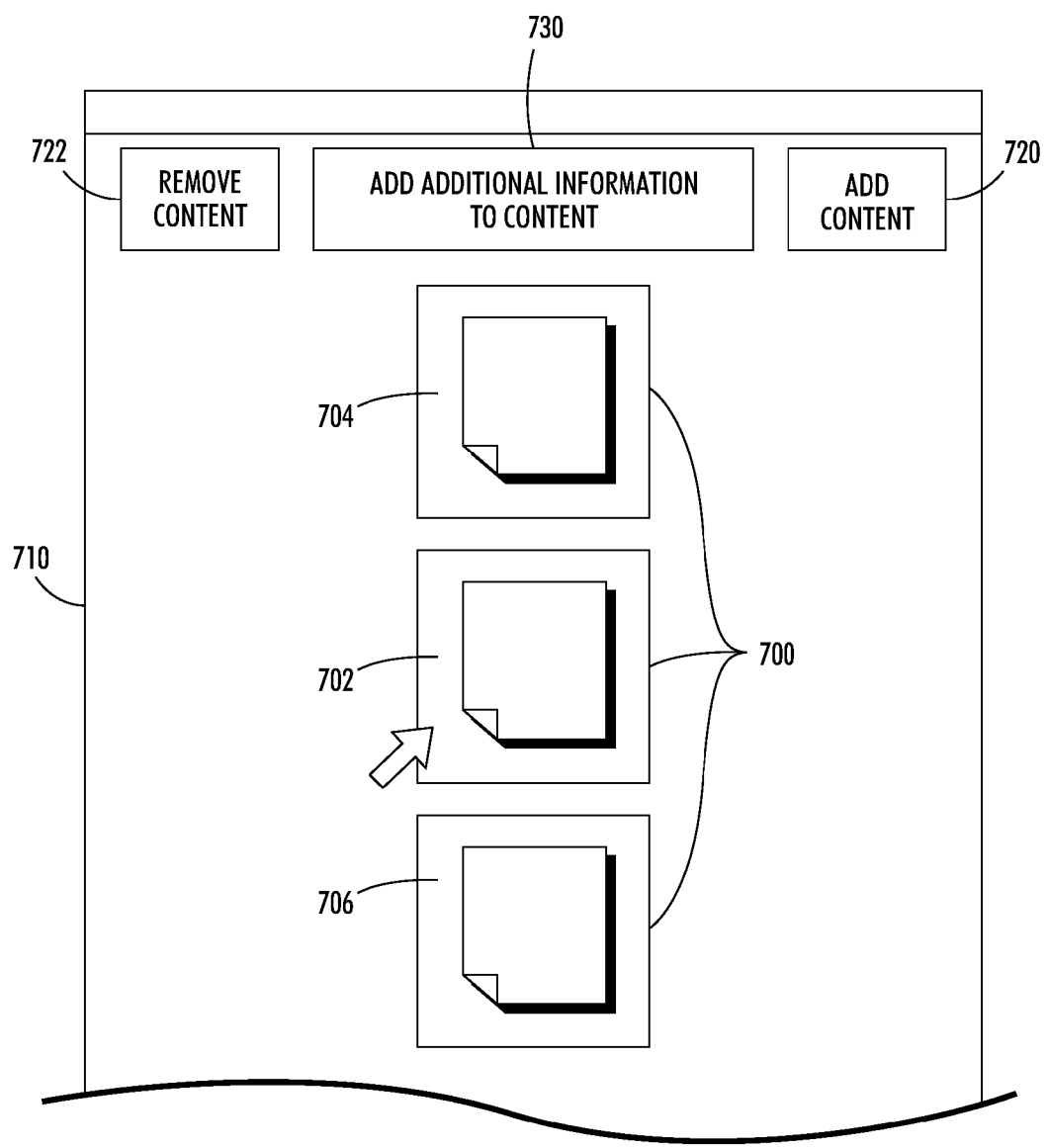
FIG. 7 illustrates an exemplary implementation of arranging collected data page units.

FIG. 7 illustrates an exemplary implementation of arranging collected data page units using the organization unit 120 of the document generator 100. After the data page units are collected, references 700 to the collected data page units can be displayed to the user in a graphical user interface (GUI) 710. The references can be represented as, for example, geometric shapes, a text-based descriptions, thumbnail images of what the data content looks like when displayed, and the like. The user can view the data content referenced by references 700 by selecting one or more of the references 700 (e.g., by double clicking on the references with their mouse). The user can add and/or remove one or more of the references 700 to the data content using an "Add Content" button 720 and a "Remove Content" button 722, respectively. If the user activates the button 720, the user can return to collecting data content as described herein. In addition, an "Add Addition Information to Content" button 730 can allow a user to add metadata to the references 700, such as labels, descriptions, permission levels, and the like.

Using a data entry device, such as a mouse, the user can arrange the data page units in a user-defined ordered sequence by changing the position of the references 700 with respect to each other. For example, the user can move a reference 702 so that is in between references 704 and 706 to define an ordered sequence of data page units including a sequence of reference 704 to reference 702 and from references 702 to reference 706.

Figure 8:
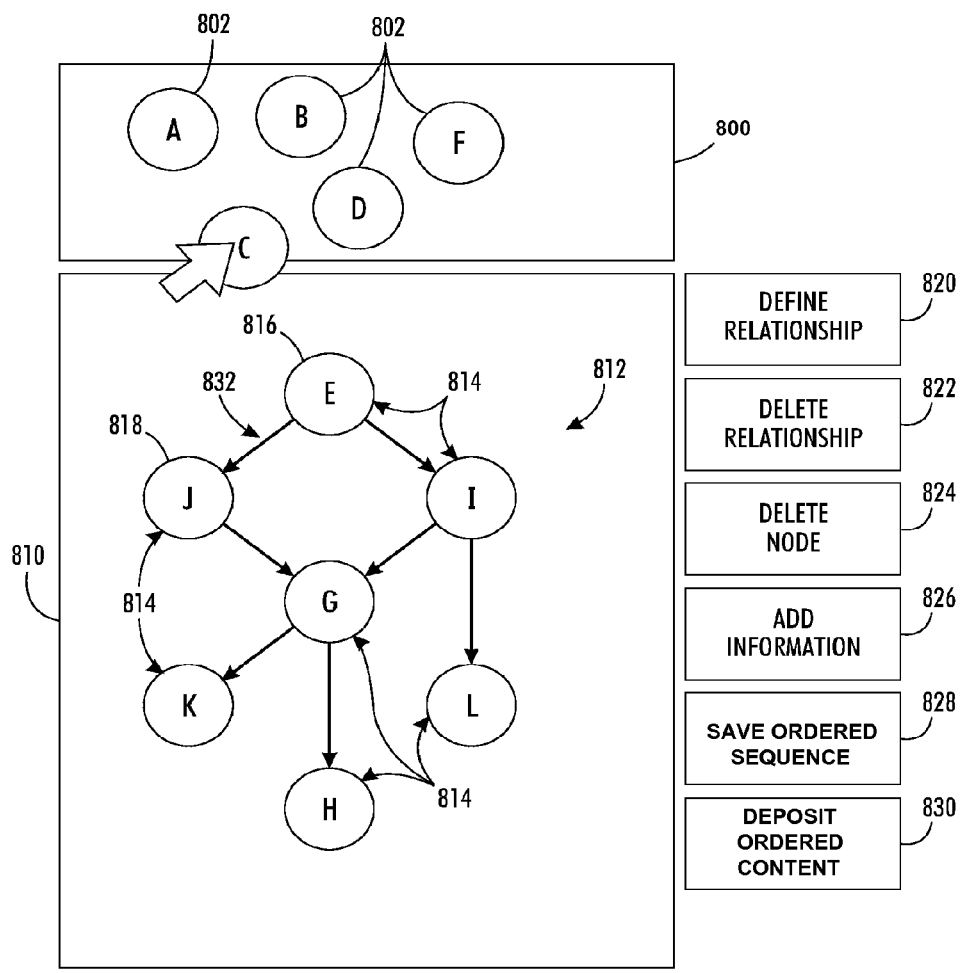
FIG. 8 illustrates another exemplary implementation of arranging collected data page units.

FIG. 8 illustrates another exemplary implementation of arranging collected data page units using the organization unit 120 of the document generator 100. The present embodiment includes a hopper 800, an ordered sequence forming area 810, a "Define Relationship" button 820, a "Delete Relationship" button 822, a "Delete Node" button 824, an "Add Information" button 826, a "Save Ordered Sequence" button 828, and a "Deposit Ordered Content" button 830. The hopper 800 holds references 802 to data page units that have been collected by the user, but that have not been inserted into a user-defined ordered sequence. In the present embodiment, the references to the data page units are represented graphically as circles surrounding an identifier that identifies the data content being referenced. In some embodiments, the references can be thumb nail images of the data content. For example, the references can be a thumb nail image of a web page that has been collected.

The ordered sequence forming area 810 depicts an ordered sequence of data page units 812 being formed by the user and having multiple paths. To move the references from the hopper 800 to the area 810, the user can use a click-and-drag function implemented with a pointing device, such as a mouse. For example, the user can click on a reference 804 and drag the reference 804 into the area 810.

To form the ordered sequence of data page units 812, the user can arrange references 814 that have been inserted into the area 810 using the click-and-drag function to position the references 814 in a desired location. By activating the button 820, the user can use a line drawing tool to draw lines between the references 814 to define relationships between the data page units referenced by the references 814. For example, the user can draw a line 832 between a reference 816 and a reference 818 with an arrow head pointing to the reference 818. The relationship defined between the data page units occurs external to the data page units such that the relationships are not inserted into data page units and the data page units themselves are not modified or changed when a relationship is defined. For example, an existing link structure within the data page units remains unchanged by the specification of the relationships. As such, the relationships can define connections externally between independent discrete data page units in the ordered sequence so that a connection between the data page units is not defined by hyperlinks within the data page units. If the user wishes to delete a relationship, the user can activate button 822 can select the relationship to be deleted. Likewise, the user can delete a reference node from the ordered sequence of data page units 812 by activating the button 824 and selecting the reference node to be deleted.

If a user wishes to add metadata to the ordered sequence of data page units 812, the user can activate button 826, which in some embodiments, can result in a display of a submenu that provides the user with an option of types of information to be added. To associate the metadata with a reference node or a relationship line, the user can select the reference node or relationship line.

The user can save the ordered sequence of data page units 812 by activating the button 828. For embodiments where the user develops the ordered sequence of data page units as part of a content management website, such as a website for developing and maintaining a blog, the website can save the ordered sequence of data page units to storage associated with the website and can associate the ordered sequence of data page units with the account of the user. For embodiments where the user develops the ordered sequence of data page units on the user's computing device, the ordered sequence of data page units 812 can be stored in storage associated with the user's computing device. Additionally, the user can choose to deposit the ordered sequence of data page units 812 in a repository by activating the button 830.

As the user develops the ordered sequence of data page units 812, an underlying data structure is maintained, such that when a reference node is inserted into the area 810, the underlying data structure is updated to include information concerning the reference node. Likewise, when a relationship is defined by the user in the area 810, the underlying data structure is updated to reflect the relationship. Therefore, the organization unit 120 can define a container for maintaining the ordered sequence of data page units 812 such that the references and the relationships between them are included in the data structure. In some embodiments, the underlying data structure can be an XML document.

FIG. 9 shows exemplary portions of an XML document 900 that can function has an underlying data structure for maintaining ordered sequences of data page units that can be depicted to a user. The XML-based data structure defines sections that can be mapped to an object of an ordered sequence of data page units including graphical objects, such as nodes and edges, as well as metadata. In the present example, the XML document 900 includes a container section 910 that encapsulates the entire ordered sequence within the XML document 900. The container section 910 is defined as a "trail" by tag 912, which can be used to identify the XML document 900 as an underlying data structure for ordered sequences of data page units. The XML document includes a name "New Trail" using the tag 914 and identifies a location at which the ordered sequences of data page units can be retrieved using source tags 916.

Sections 920 and 940 are included within the container section 910 and represent data page units included in the ordered sequences of data page units as well as the relationship of the data page units with respect to other data page units in the ordered sequences of data page units. For example, section 920 can include a data page unit referenced using tag 922 and a name "Three Leaps of Faith Rule" specified by a name tag 924. A location at which the referenced data page unit can be retrieved is identified using the source tags 926.

The relationship of the data page unit in section 920 to other nodes in the ordered sequence of data page units can be represented as children of the node. In the present embodiment, a children tag 928 can identify which data page units have been defined to follow the data page unit referenced in section 920. For example, a single data page unit identified by tag 930 has been defined to follow the data page unit of section 920 in the ordered sequence.

To identify the data page units within the XML document 900, a unique identifier can be specified in the node type tags (e.g., 912, 930). For example, the tag 930 includes an identifier 932 that has been uniquely assigned to a data page unit referenced in the XML document 900. The referenced data page unit identified by the identifier 932 is defined by section 940, which is followed by data page units in the ordered sequences of data page units that are identified by tags 942 and 944 encapsulated by the children tag 946. Thus, in the present example, an ordered sequence of data page units having a name "New Trail" includes a data page unit named "Three Leaps of Faith Rule," which is followed in sequence by a data page unit named "Happy First Birthday, Ribbonfarm", which in turn is followed by two other data page units creating a diverging paths in the ordered sequence of data page units.

Figure 10:
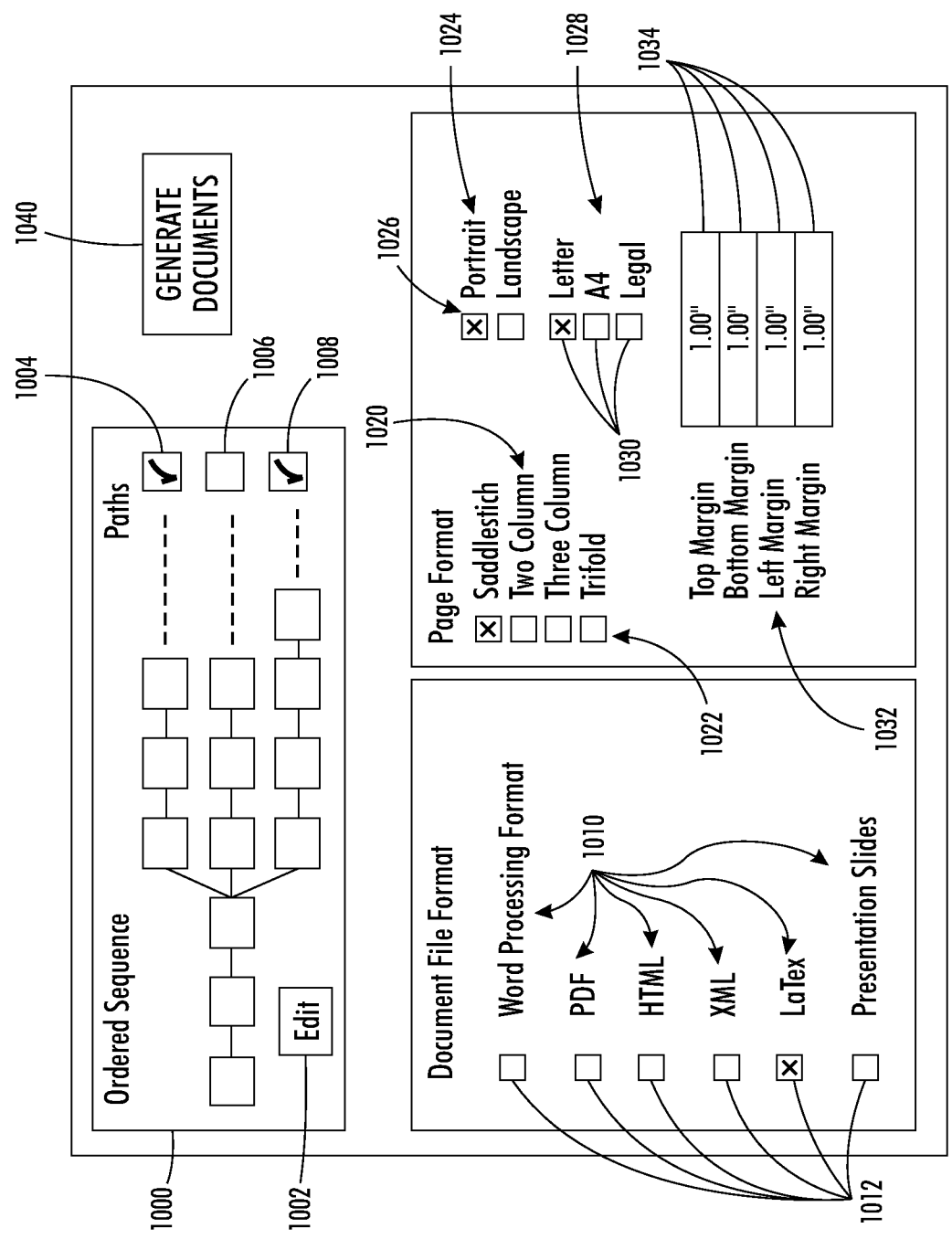
FIG. 10 illustrates an exemplary implementation of generating a formatted document incorporating collected data page units.

FIG. 10 illustrates an exemplary implementation of generating a formatted document using the document formatting unit 130 of the document generator 100. An ordered sequence 1000 for which a document is to be generated can be displayed to the user. In some embodiments, a name of a file in which the ordered sequence 1000 is stored can be displayed instead of in addition to the graphical depiction of the ordered sequence 1000. If the user wishes to edit the ordered sequence 1000, the user can select the "Edit" button 1002, which can display the ordered sequence in an editable form using the organization unit 120. The user can select the paths of the ordered sequence for which a formatted document should be generated. In the present example, the user can select the paths by checking boxes 1004, 1006, and 1008 associated with the paths. If the user selects a single path, a formatted document can be generated for the single path. If the user selects multiple paths, the document generator 100 can generate a formatted document for each of the paths selected.

The user can specify a file format in which the formatted document can be generated. For example, the user can be presented with available document file formats 1010 and can select the available formats by checking boxes 1012. Likewise, the user can define the page format for the document. For example, the user can choose a body layout 1020 using check boxes 1022, a page orientation 1024 using check boxes 1026, and a paper size 1028 using check boxes 1030. The user can also specify margins 1032 using data entry fields 1034.

Once the user is satisfied with the formatting selections, the user can select the "Generate/Export Document" button 1040 to convert each of the data page units in the ordered sequence 1000 into a common format, which can be the format of the generated document or can be a different format. Prior to reformatting the data page units, the formatting unit can regenerate the data page units to ensure that the data page units to be included in the formatted document include the most up-to-date content. Once the data page units are in a common format the formatting unit can generate the formatted document by combining or otherwise associating the data page units as specified by the ordered sequence 1000 and outputting or exporting the formatted in the desired format. The formatted document can be distributed to others, displayed via a web site, printed, and the like.

Figure 11:
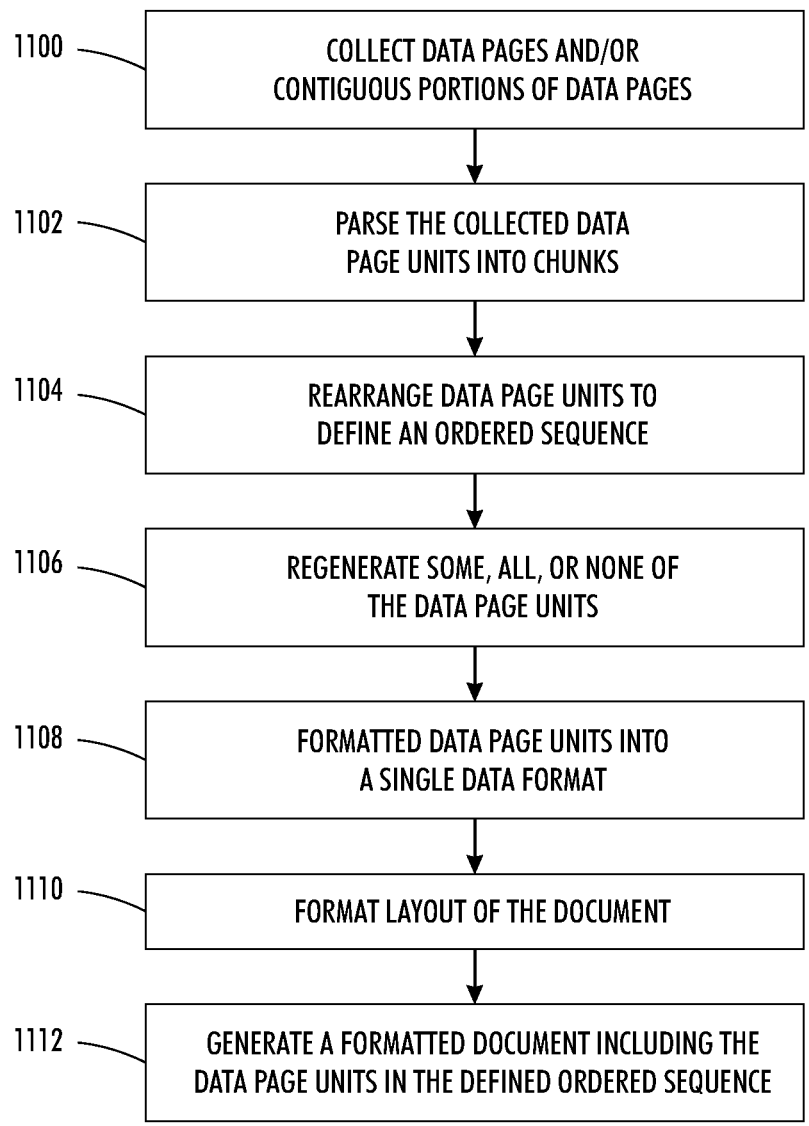
FIG. 11 is a flowchart illustrating a process of generating a formatted document.

FIG. 11 is a flowchart illustrating a process of generating a formatted document. To begin, the user collects data pages, and/or contiguous portions of data pages, from one or more sources, such as web pages, word processing documents, PDF documents, LaTex documents, and the like (1100). The collected data pages, or portions thereof, are associated with a first ordered sequence based on the order in which the data pages, or portions thereof, were collected. Subsequently, the user can parse the collected data page units into chunks to define segments of the contiguous content within the collected data pages, or portions thereof (1102). Data page units including chunks, data pages, and/or portions of data pages can be rearranged to define an ordered sequence that is different from the ordered sequence in which the data page units were collected (1104). When the user wishes to generate a formatted document based on the user-defined ordered sequence, the formatting unit can regenerate some, all, or none of the data page units to ensure that the data page units to be included in the formatted document include the most up-to-date content (1106). Subsequently the formatting unit can reformat the data page units into a common data format (1108), which can be specified by the user, and can select the layout of the document (1110).

Once the data page units have been formatted, a formatted document including the data page units in the defined ordered sequence can be generated and output (1112). The formatted document can be outputted as a word processing document format, portable document format (PDF), slide presentation format, LaTex-based format, mark-up language format, such as hypertext mark-up language (HTML), extensible mark-up language (XML), and the like, and/or other suitable format. The formatted document can be distributed to others, displayed via a web site, printed, and the like.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for generating multi-path formatted documents associated with a collection of data page units, using a document generator implemented by a computing system with one or more computing devices, the method comprising:
collecting data page units using a collector of the document generator, the collector presenting the user with a list of data page units from which to select, in response to a user selection from among the list of data page units, the selected data page units being collected intact and in their original format;
re-sequencing the selected data page units using an organization unit of the document generator to associate the selected data page units with a plurality of ordered sequence paths in a multi-path formatted document, each ordered sequence path comprising a user-defined ordered sequence, wherein a reader of the multi-path formatted document selects one or more of the plurality of ordered sequence paths;
converting at least one of the selected data page units from a first format of the respective selected data page unit into a second format common to all converted data page units; and
outputting a multi-path formatted document incorporating the selected data page units in the ordered sequence according to one or more ordered sequence paths selected by the reader, using a formatting unit of the document generator.

2. The method of claim 1, further comprising:
defining contiguous section of content within a selected data page unit; and
encapsulating the contiguous section of content to facilitate rearrangement of the contiguous section in the ordered sequence paths independent of the selected data page unit from which the contiguous section of content originates.

3. The method of claim 1 further comprising:
modifying the at least one of the selected data page units in response to an input from a user that is authorized to modify the at least one selected data page unit.

4. The method of claim 1, wherein collecting the selected data page units comprises storing references to the selected data page units.

5. The method of claim 1, wherein re-sequencing the selected data page units comprises
displaying a workspace rendering references to the selected data page units graphically; and
rearranging the references in the workspace in response to user input.

6. The method of claim 1, wherein outputting a formatted document includes outputting a different formatted document for each of the selected ordered sequence paths.

7. The method of claim 1, wherein collecting selected data page units comprises:
selecting a contiguous area of content of a web page using an area selector; and
collecting content within the contiguous area, the content being collected intact and in its original format.

8. The method of claim 1 further comprising associating metadata with the selected data page units.

9. A non-transitory computer readable medium storing instructions executable by a computing system including at least one computing device, wherein execution of the instructions implements a method for generating multi-path formatted documents associated with a collection of data page units using a document generator implemented by the computing system, the method comprising:
collecting data page units using a collector of the document generator, the collector presenting the user with a list of data page units from which to select, in response to a user selection from among the list of data page units, the selected data page units being collected intact and in their original format;
re-sequencing the selected data page units using an organization unit of the document generator to associate the selected data page units with one of a plurality of ordered sequence paths in a multi-path formatted document, each ordered sequence path comprising a user-defined ordered sequence, wherein a reader of the multi-path formatted document selects one or more of the plurality of ordered sequence paths;
converting at least one of the selected data page units from a first format of the respective selected data page unit into a second format common to all converted data page units; and
outputting a formatted document incorporating the selected data page units in the ordered sequence according each of the a selected one or more of the ordered sequence paths, using a formatting unit of the document generator.

10. The non-transitory computer readable medium of claim 9, further comprising:
defining contiguous section of content within a selected data page unit; and
encapsulating the contiguous section of content to facilitate rearrangement of the contiguous section in the ordered sequence paths independent of the selected data page unit from which the contiguous section of content originates.

11. The non-transitory computer readable medium of claim 9 further comprising:
modifying the at least one of the selected data page units in response to an input from a user that is authorized to modify the at least one selected data page unit.

12. The non-transitory computer readable medium of claim 9, wherein re-sequencing the selected data page units comprises
displaying a workspace rendering references to the selected data page units graphically; and
rearranging the references in the workspace in response to user input.

13. The non-transitory computer readable medium of claim 9, wherein outputting a formatted document includes outputting a different formatted document for each of the selected ordered sequence paths.

14. The non-transitory computer readable medium of claim 9, wherein collecting data page units comprises:
selecting a contiguous area of content of a web page using an area selector; and
collecting content within the contiguous area, the content being collected intact and in its original format.

15. A system for generating a multi-path formatted document associated with a collection of selected data page units comprising:
a computing system including at least one computing device, the computing system configured to implement:
a collector operative to a collect data page units, the collector presenting the user with a list of data page units from which to select, in response to a user selection from among the list of data page units, the selected data page units being collected intact and in their original format;

an organization unit operative to re-sequence the selected data page units to associate the selected data page units with a plurality of ordered sequence paths in a multi-path formatted document, each ordered sequence path comprising a user-defined ordered sequence, wherein a reader of the multi-path formatted document selects one or more of the plurality of ordered sequence paths; and a formatting unit operative to receive the reader selection of one or more of the plurality of ordered sequence paths from among a listing of the plurality of ordered sequence paths, to convert at least one of the selected data page units from a first format of the respective selected data page unit into a second format common to all converted data page units, and to output the multi-path formatted document formatted document incorporating the data page units in the ordered sequence according to the reader-selected one or more of the ordered sequence paths.

16. The system of claim 15, wherein the organization unit defines a contiguous section of content within a selected data page unit and encapsulates the contiguous section of content to facilitate rearrangement of the contiguous section in the ordered sequence paths independent of the selected data page unit from which the contiguous section of content originates.

17. The system of claim 15, wherein the formatting unit outputs a different formatted document for each of the selected ordered sequence paths.

* * * * *